Sept. 27, 1927.  
P. A. CHAFA ET AL  
1,643,542  
SHIFTING TRACTOR HITCH  
Filed Nov. 27, 1926  
2 Sheets-Sheet 1
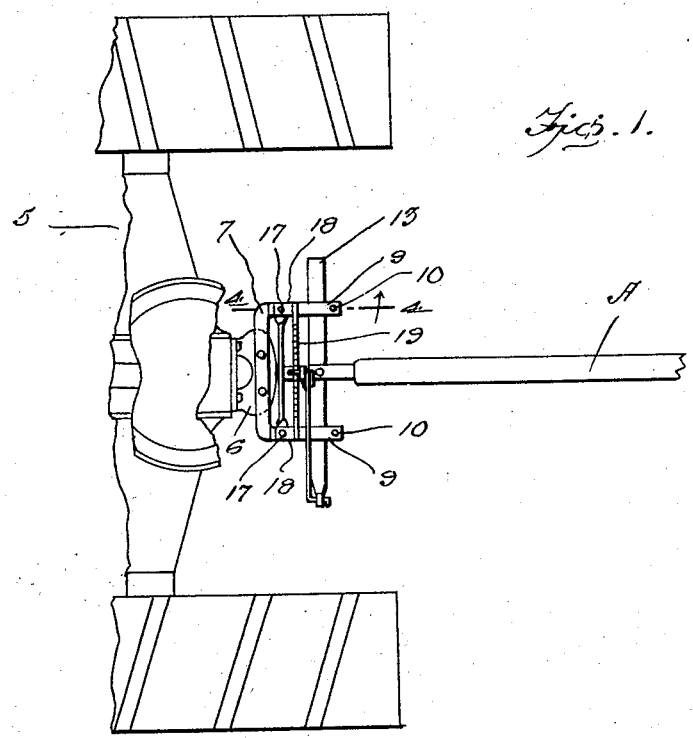
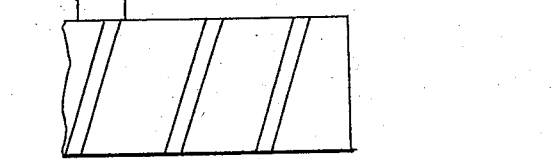
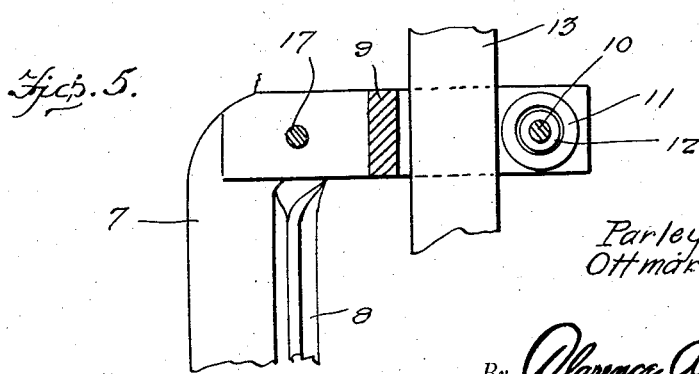
Inventors  
Parley A. Chafa  
Ottmar R. Gruber  
By Clarence A. O'Brien  
Attorney Sept. 27, 1927.   P. A. CHAFA ET AL   1,643,542
SHIFTING TRACTOR HITCH
Filed Nov. 27, 1926   2 Sheets-Sheet 2

Inventors
Parley A. Chafa
Ottmar R. Gruber

By Clarence A. O'Brien
Attorney

Patented Sept. 27, 1927.

1,643,542

UNITED STATES PATENT OFFICE.

PARLEY A. CHAFA AND OTTMAR R. GRUBER, OF BRIDGEWATER, IOWA.

SHIFTING TRACTOR HITCH.

Application filed November 27, 1926. Serial No. 151,115.

This invention relates to new and useful improvements in hitching devices for facilitating the attachment of plows and other agricultural implements to tractors.

The primary object of the invention resides in the provision of a hitch of this character wherein there is provided a sliding bar to which the tongue of the plow or agricultural implement may be attached, means being provided for sliding said bar transversely of the longitudinal axis of the tractor so that the plow or implement may be moved to either side of the tractor when plowing on a side hill. It is well known that when performing such an agricultural operation the tractor and plow when not adjustably connected is bound to slide downhill, and furthermore the plow is not taking a full cut. However, by reason of a hitch of this character this disadvantage may be readily overcome by the rapid hitching of the agricultural implement to either side of the longitudinal axes of the plow.

A further and important object is to provide a shifting tractor hitch of this character wherein the sliding agricultural implement tongue attaching bar may be readily adjusted by the operator of the tractor without leaving the tractor seat and wherein the proper adjustment will be maintained by reason of a locking means provided for said sliding bar.

A further and most important object is to provide a tractor hitch of this character that may be readily associated with practically all types of tractors, and this without requiring great skill, labor, or expenditure.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts throughout the several views:

Figure 1 is a top plan view of the rear end of a conventional tractor equipped with our improved shifting tractor hitch.

Figure 4 is an enlarged longitudinal section through one end of the hitch taken substantially upon the line 4—4 of Figure 1, and Figure 5 is a longitudinal section taken substantially upon the line 5—5 of Figure 4.

Figure 2:
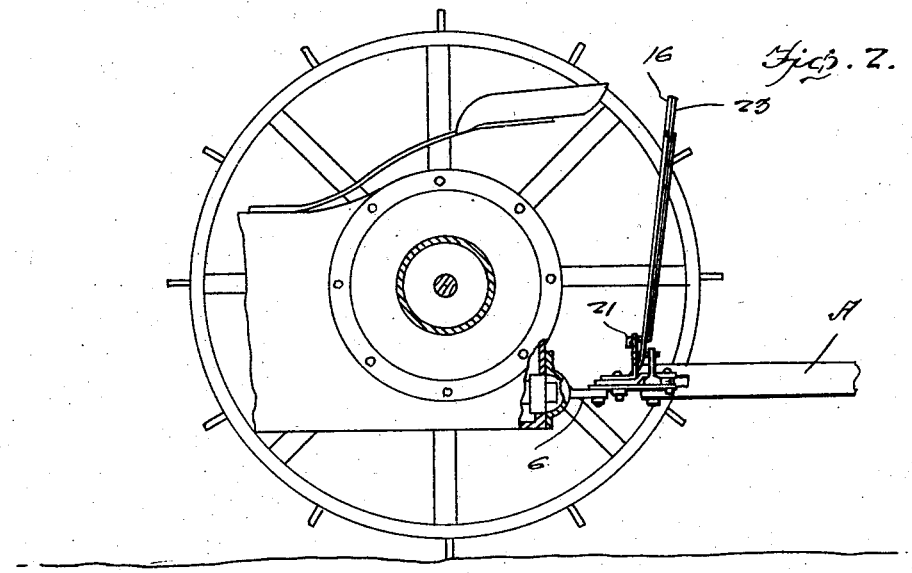
Figure 2 is a view in section through the tractor for disclosing the tractor hitch in side elevation.

Now having particular reference to the drawings, 5 indicates a well known type of tractor, the rear end of which is provided with the usual plate-like draw bar 6. The invention per se consists of a relatively U-shaped bar 7 bolted or otherwise rigidly secured at its central portion to the top side of said draw bar as clearly disclosed in Figures 1 and 2. The end arms of said U-shaped bar extend longitudinally rearwardly of the tractor, and are interconnected at their inner ends by a cross bar 8, the ends of which are twisted for flush engagement with the under sides of the end arms of said U-shaped bar 7, see Figures 3 and 5.

Secured to the top sides of the end arms of said U-shaped bar 7 by reason of the same connecting bolt between said bar 7 and the arm connecting bar 8 are plates 9—9, the outer ends of which are offset upwardly so as to have spaced relation with the end arms of the cross bar 7 as clearly indicated in Figure 4. The outer ends of the plates 9—9 are connected to the ends of the arms of the bar 7 by bolt and nut connections 10—10, while surrounding the bolts between the plates and arms are loose rollers 11—11 spaced from the bolts of the connections by spacing collars 12.

Slidably disposed between the plates and arms of the U-shaped bar 7 in back of the rollers 11—11 is an elongated cross bar 13, the center of which is provided with an opening to permit of the attachment of the tongue A of a plow or other agricultural implement thereto. One end of the sliding bar 13 is bent upwardly as at 14 and pivotally connected thereto is one end of a link rod 15 that extends inwardly and is in turn pivotally secured to a vertical hand lever 16 that is pivoted at its lower end to the center of the connecting bar 8 between the end arms of the U-shaped bar 7. Obviously a swinging of this lever in reverse directions will cause the sliding movement of the bar 13 in a similar direction for moving the point of attachment between the plow or other agricultural implement and the tractor to opposite sides of the center of said tractor.

Figure 3:
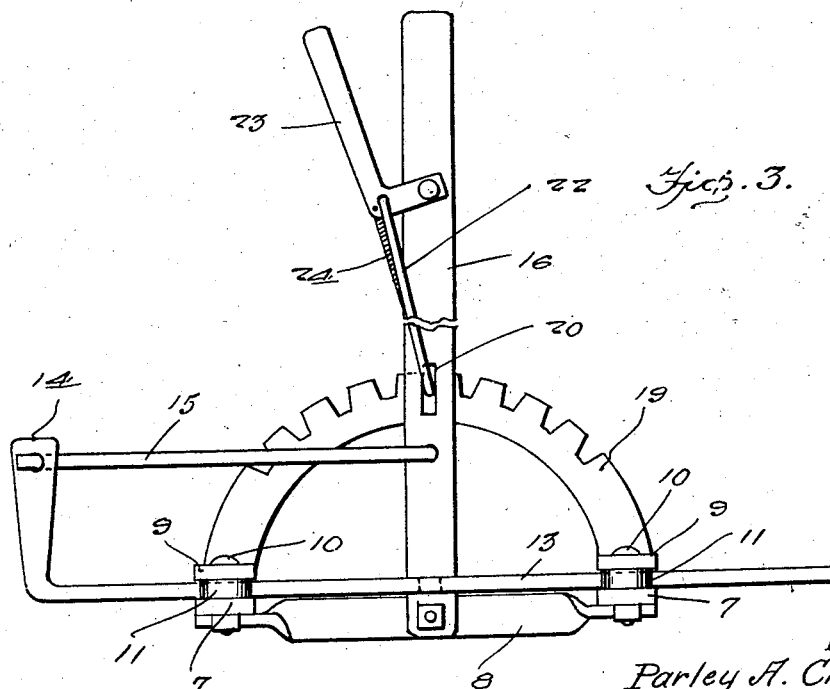
Figure 3 is a front side view of the hitch per se.

The bolt and nut connections which are now designated by the reference characters 17—17 between the arms of the U-shaped bar 7, the plates 9—9 and cross bar 8 further serve as a connecting means for the rearwardly bent ends 18—18 of a toothed segment 19 forwardly of the connecting bar 8 for the end arms of the U-shaped bar 7, it being apparent from a consideration of Figure 2 that the hand lever 16 is upon a slight incline for the reason that the lower end thereof must pass beneath the segments 19 for facilitating the pivotal attachment of the same to said cross bar 8.

Directly at the segment 19 said hand lever 16 is provided with a vertical slot 20 through which passes the rearwardly bent end 21 of a detent bar 22 that is pivoted at its upper end to a bell crank lever 23 that is normally swung downwardly by reason of a coil spring 24 so that said bent end of the rod will engage within the teeth of the segment 19. Obviously, by swinging inwardly upon the bell crank lever 23 said detent is released from the teeth of the segment so as to permit the hand lever 16 to be moved in reverse direction to cause the sliding of the tongue attached bar 13. By reason of the fact that the pull upon this bar 13 is always in a direction away from the tractor, the easy sliding movement of this bar is made possible due to the presence of the rollers 11—11 that are engaged by the front edge of said sliding bar.

In view of the foregoing specification when considered in conjunction with the accompanying drawings it will at once be apparent that we have provided a highly novel, simple, and efficient shifting tractor hitch that is well adapted for all the purposes heretofore designated, even though we have herein shown and described the invention as consisting of certain detail structural elements it is nevertheless to be understood that some changes may be made therein without effecting the spirit and scope of the appended claims.

Having thus described the invention, what we claim as new is:—

1. In a tractor hitch, a member rigidly secured to the tractor draw bar, a cross bar slidably associated with the member, one end of said cross bar being disposed upwardly, a vertical lever pivotally supported adjacent its lower end on said rigid member, a link rod connecting the lower end of said lever with said upwardly disposed end of the slidable cross bar, whereby said cross bar to which an agricultural implement is connected may be shifted, with respect to the tractor in a transverse direction, when the upper end of the lever is actuated, and means for locking the lever in any predetermined shifted position.

2. In a tractor hitch, a member rigidly secured to the tractor draw bar, a cross bar slidably associated with the member, one end of said cross bar being disposed upwardly, a vertical lever pivotally supported adjacent its lower end on said rigid member, a link rod connecting the lower end of said lever with said upwardly disposed end of the slidable cross bar, whereby said cross bar to which an agricultural implement is connected may be shifted, with respect to the tractor in a transverse direction, when the upper end of the lever is actuated, means for locking the lever in any predetermined shifted position, said means comprising a ball and ratchet mechanism associated with the lever and the stationary member respectively.

3. In a tractor hitch, a substantially U-shaped frame rigidly secured at its base portion to the tractor draw bar, a transverse connecting bar between the arms of the U-shaped frame, a cross bar slidable between the free ends of the arms of the frame and to which an agricultural implement is to be connected, guide means for the slidable cross bar, one end of said slidable cross bar being disposed upwardly, a vertical lever pivotally supported adjacent its lower end on the connecting member, a link rod connecting the pivoting end of the lever to the upstanding end of the slidable cross bar, whereby said cross bar may be shifted transversely with respect to the tractor when the upper end of the lever is actuated.

4. In a tractor hitch of the class described, a substantially U-shaped member rigidly secured at the base portion thereof to the tractor draw bar, a transversely extending member secured at its ends to the inner end portions of the arms of the U-shaped member, an elongated cross bar adapted for slidable movement across the outer ends of the arms of the U-shaped member and to which said cross bar an agricultural implement is to be attached, guide rollers on the arms of the U-shaped member for cooperation with the slidable cross bar, one end of the slidable cross bar being bent upwardly, a vertical lever pivoted at its lower end on said transverse connecting member, a link rod connecting the pivoted end of the lever to the upwardly disposed end of the slidable cross bar, whereby said cross bar may be shifted transversely of the tractor when the upper end of the lever is actuated, and means for holding the lever in any predetermined shifted position.

In testimony whereof we affix our signatures.

PARLEY A. CHAFA.
OTTMAR R. GRUBER.